March 12, 1935.  E. E. NOVOTNY  1,993,942
METHOD AND APPARATUS FOR MOLDING THERMOPLASTIC MATERIAL
Filed Feb. 16, 1929   3 Sheets-Sheet 1

INVENTOR.
EMIL E. NOVOTNY.
BY Cavanagh + James
ATTORNEYS.

March 12, 1935.  E. E. NOVOTNY  1,993,942
METHOD AND APPARATUS FOR MOLDING THERMOPLASTIC MATERIAL
Filed Feb. 16, 1929  3 Sheets-Sheet 2

INVENTOR.
EMIL E. NOVOTNY.
BY Cavanagh + James
ATTORNEYS.

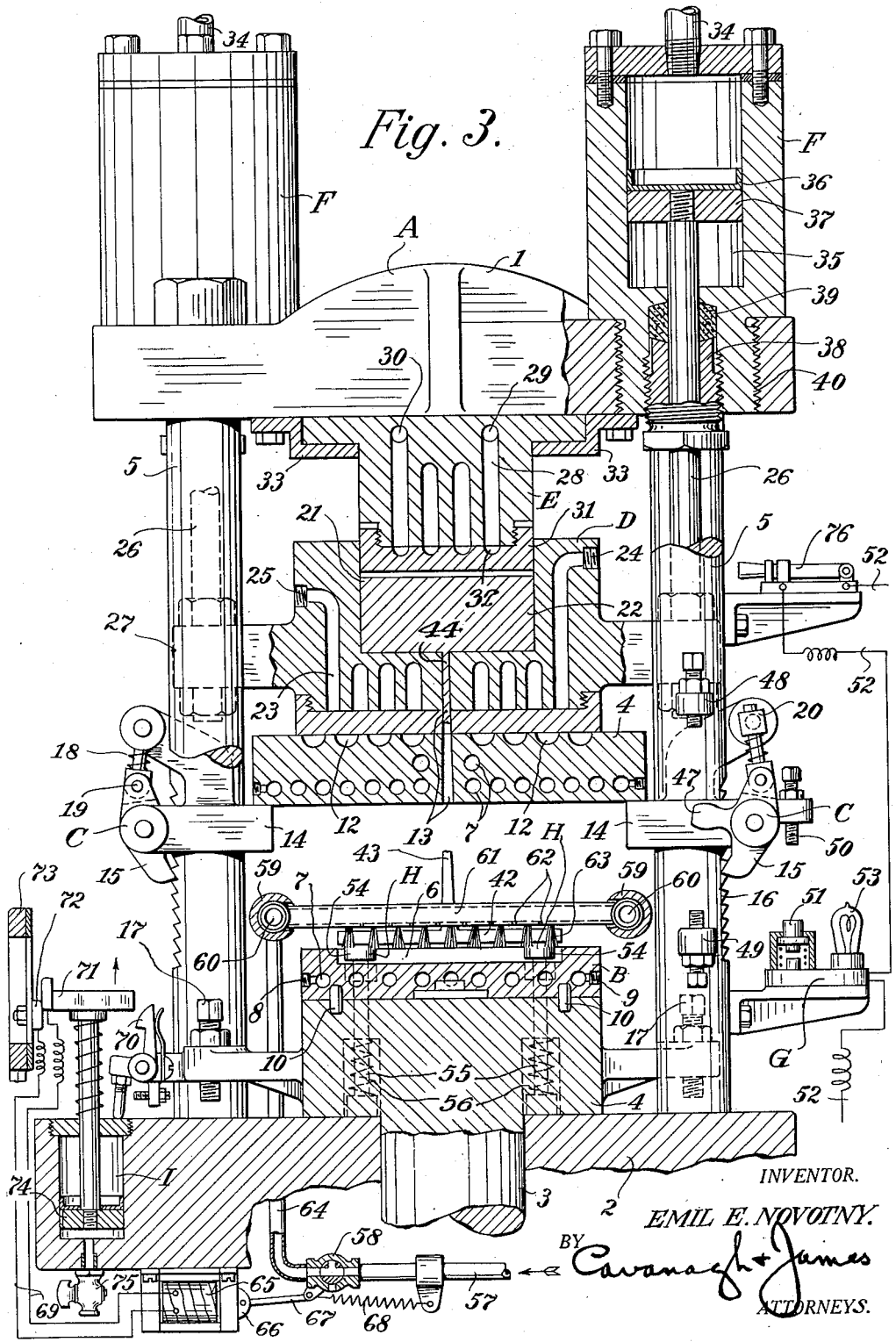

Patented Mar. 12, 1935

1,993,942

UNITED STATES PATENT OFFICE 1,993,942

METHOD AND APPARATUS FOR MOLDING THERMOPLASTIC MATERIAL

Emil E. Novotny, Philadelphia, Pa., assignor to John Stogdell Stokes, Huntingdon Valley, Pa.

Application February 16, 1929, Serial No. 340,605

38 Claims. (Cl. 18—17)

This invention relates to a method and an apparatus for molding thermoplastic cementitious materials, particularly thermosetting materials, such as synthetic resinous compositions which set permanently and infusibly.

More specifically, some of the novel features of my method and of my apparatus for practicing the same are:

1. It holds a supply of moldable material in a quantity sufficient for several molding cycles. The material may consist either of a mixture of ingredients convertible within the mechanism into a molding plastic composition, or else it may consist of a previously processed molding compound.

2. The moldable material is received in the cavity of a pressure resisting container or cylinder capable of withstanding a hydrostatic pressure produced preferably by a snug fitting ram forced within the chamber.

3. The travel of the ram within the pressure resisting container is regulated with respect to the flow of material from said container and with respect to the quantity or level of material remaining therein. The ram applies pressure to the material for a portion of the cycle, and releases the pressure and forms a partial vacuum within the chamber for another portion of the cycle by withdrawing a short distance within the container but not far enough to open the container to atmospheric pressure. After material in chamber needs replenishing the ram is withdrawn entirely for the admission of another charge of material.

4. The apparatus includes means for maintaining the supply of moldable material in a soft plastic flowing condition until the moldable mixture or composition has been forced as a well warmed and blended compound into a mold defining a cavity or cavities capable of imparting the desired form to the compound. This is accomplished by heating the container and ram with a large volume of relatively low temperature heating fluid circulating within passages provided for the purpose, and by isolating the container from the mold which is much hotter.

5. The apparatus includes means for consolidating the mixture of ingredients into a thoroughly blended and processed molding compound while forcing the same into the mold cavity, said means preferably being exemplified by a passage or passages of relatively small cross section, which passages are preferably heated under conditions which will make such blending and consolidation uniform.

6. The mold cavity is closed prior to the introduction of the moldable composition and is kept closed to withstand the pressure of the material filling the cavity, until the pressure is released from within both the supply container and the passages leading to the mold cavity.

7. The apparatus is so designed as to facilitate separation of the relatively nonplastic, hard and set molded plastic composition from the plastic moldable material, specifically by the use of a continuous divergent passage.

8. Means is provided for maintaining the composition in the passage or passages leading from the pressure resisting container at a temperature approximating that of the plastic material at its source, and for maintaining the composition in the passage or passages close to the mold and its cavities at a temperature approximating the temperature of the mold.

9. The mold and cavities are opened, preferably with simultaneous clearing of already set composition from the aforesaid passages.

10. The formed, set, and hardened pieces are ejected from the cavities or mold, and if desired onto a suitable conveyor belt or into a receptacle provided for the purpose.

11. Means are provided for brushing and blowing any foreign matter from the mold and its cavities.

12. The pressure resisting container and upper mold section or platen is movably supported relative to the end of the ram within the pressure resisting container, and its position is varied in accordance with the supply level of the material within the container, so that the motion of the ram is kept down to a minimum. The movement is so regulated that alternate pressure and vacuum conditions are obtained in the container, the latter acting, however, as a constantly closed oven-like warming chamber. Additional means are provided to stop the valve timing and operating mechanism and to open the press in a lowered position when the supply of plastic material becomes low.

13. An audible or visual signal is provided to indicate that the press has been lowered and stopped and is in position to receive a renewed supply of moldable material. The material may be supplied manually by an operator, or the signal can actuate a supplementary hopper or feeding device for the make-up material.

14. The operation of the press is restored to normal when a new supply of material has been placed in the container.

15. A simple and quick acting mold holder positions molds and hand molds in operative coincidence with the press mechanism.

In order that my invention may be better understood, a description of the accompanying drawings is given:

Figure 3 in elevation and section illustrates the press in a partly open position ready for the removal of the molded piece.

Figure 1:
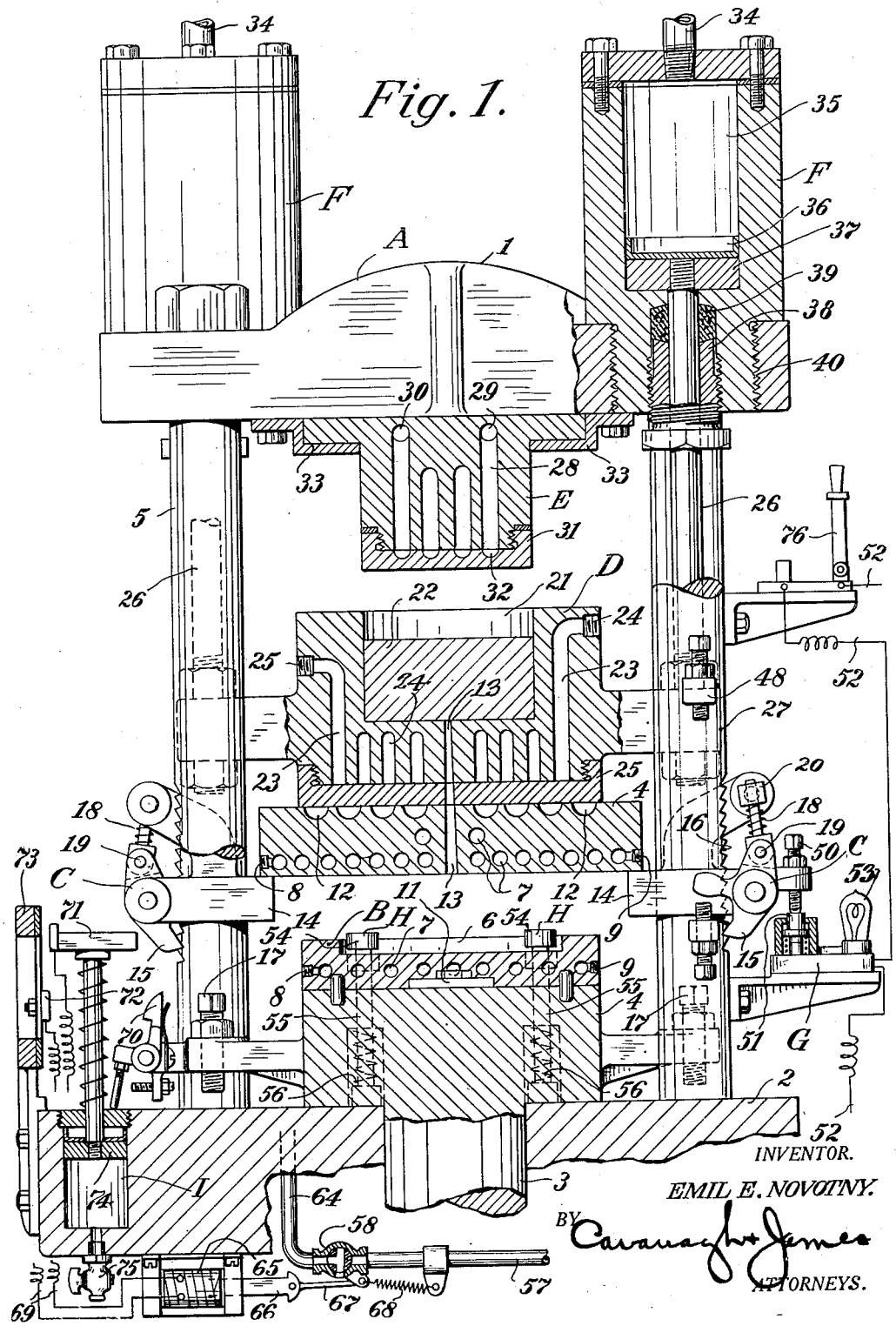
Figure 1 is an elevation partly in section illustrating one stage in the operation of a hydraulic press equipped for hydrostatic pressure molding. In this illustration the press is in a fully open position with the moldable plastic material within the pressure cylinder.

Figure 1 illustrates a suitable hydraulic press A provided with press head 1, base 2, movable ram 3, platen 4, and strain rods 5. This press is provided with a suitable mold B mounted on movable ram 3. In this mold I have defined a mold cavity 6, the mold being heated, as through the cored passages indicated at 7, for which suitable inlets and outlets are provided as at 8 and 9. The cored or drilled members of mold B indicated by the numerals 7 are preferably heated, as by the admission of steam at a pressure high enough to cause a rapid reaction to ensue in the synthetic resin material being molded therein. I prefer a temperature equivalent to 100, and in many cases I find it advantageous to use a temperature equivalent to 200 pounds per square inch of steam pressure. To hold this mold member B in proper position on movable ram 3 with respect to the platen 4, close fitting pins are used as at 10 and a suitable clamp may be provided at 11.

As the piece to be molded in this case is a relatively simple one, there is no upper mold portion but the heated platen 4 is provided with passages 7 for the admission of steam under conditions of pressure and temperature similar to those prescribed for the lower mold member B. The inlet and outlet in this case are also indicated by the numerals 8 and 9. As it is desired to restrict the high temperature to the surfaces closely adjacent to the mold cavity 6, the upper face of platen 4 is cored for the passage of air for cooling and insulating purposes, as indicated at 12, or, for that matter, any other suitable cooling medium may be used in order to safeguard against overheating the upper or reservoir portion of the mechanism. At 13 I have indicated, exaggeratedly, the restricted passage through which the material will be forced under pressure into the mold cavity 6. As it is desired that the material be preheated while attenuated or in a thin cross section, some of the heating passages 7 are closely adjacent to the passage 13. The passage or outlet 13 is divergent, as shown.

Figure 2:
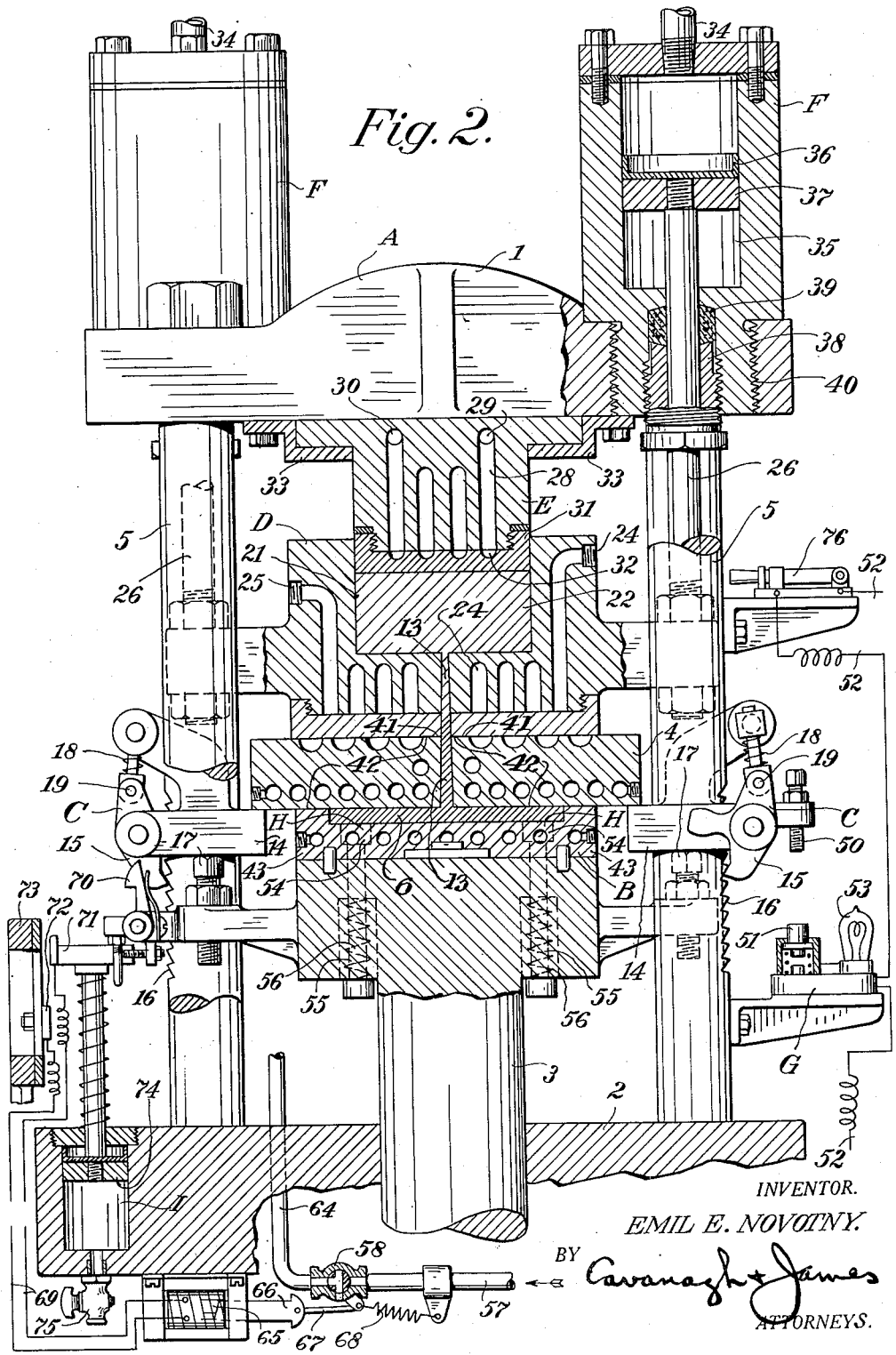
Figure 2 is an elevation, partly in section, illustrating the press in a closed position with the moldable plastic material forced under hydrostatic pressure into a mold cavity.

The upper platen 4 is variably located in a predetermined manner by means of the supporting mechanism C, regulating the travel of the collars 14 by means of the toggle pawls 15 which engage the racks 16 on the strain rods 5. In operation, briefly, the mold B is closed by upward movement of ram 3 against platen 4, which then moves upwardly with ram 3 into pressure engagement with a stationary plunger or ram E fixedly mounted on stationary press head 1. This causes ejection of a portion of the material into the mold B, as indicated in Fig. 2. Ram 3 is then lowered with mold B, but platen 4 and container D only follow slightly, being retained in position by the rack and pawl mechanism C. Mold B is therefore opened, and the pressure in container D is released, but the container is closed to the atmosphere, all as is indicated in Fig. 3. To seal mold B against platen 4 before material is injected therein under pressure, the upward movement of platen 4 is preferably yieldably resisted, as by pressure cylinders F. The molding cycle is repeated over and over until the supply of material in container D gets low, but is not wholly depleted, at which time the pawl and rack mechanism C is released, and the platen 4 follows ram 3 downward to the open position shown in Fig. 1.

The collars 14 are operated by contact with the adjustable screws 17, elevating the collar to the desired stop position with respect to the quantity of material contained in the upper reservoir. The toggle pawls 15 exert a slight pressure against the racks 16 through the tension of the springs 18 operating on the fulcrums 19, a suitable retaining device 20 being provided.

The pressure resisting container D is provided with a cavity 21 filled with a plastic material 22, and having for an outlet a continuation of the narrow restricted passage 13. The plastic material 22 may be heated to any suitable degree by means of the spiral heating passages indicated at 23, inlet 24 and outlet 25 being provided for the admission of a heating medium such as, for example, hot water or steam.

Although it is possible to admit steam at any desired pressure, I find it advantageous to admit steam at atmospheric pressure, but I prefer hot water at or below 212° F. in order that the temperature may not be so great as to cause the material 22 within the cavity 21 to become precured or set too rapidly. At the same time, however, sufficient heat should be maintained where the material is not normally plastic at room temperatures in order that such material may be readily forced by hydrostatic pressure through the abutting passages 13 to the mold cavity 6.

It will be noted that the heating passages 23 are so arranged that they will be interposed between the high heat platen 4 and the material 22 contained in cavity 21. Furthermore, I have found it preferable to form these heated passages in the shape of a spiral which, when made, is open at the points 24 and such openings are substantially enclosed by means of the cap or cover 25. This construction permits the admission of a relatively large volume of heating fluid at low temperature, whereby the material 22 is quickly heated to a plastic flowing condition at temperatures only high enough to soften the material and to maintain the material in a plastic condition for several successive molding cycles or until consumed.

The movement of the pressure resisting container D is controlled by the movement of the upper platen 4, and the container is kept in position and held against the platen 4 by means of the piston rods 26 connected to the pressure chamber D at 27, and extending upwardly into cylinders F.

Pressure ram or plunger E fits snugly but slides easily within the cavity 21 of pressure chamber D. A uniform expansion is provided through the arrangement of heating passages 28 which are preferably formed as deep spiral cuts within the ram structure E. The openings 29 and 30 permit of the admission of a heating fluid such as low temperature steam or hot water. The disposition of the heating members within the fixed ram E makes it possible to heat such ram thoroughly and at the same time to maintain a relatively uniform expansion, thus preventing any possibility of scoring the sliding surfaces of the chamber D or the ram E, and at the same time retaining a close fit within the cylinder cavity 21. So the low temperature heating fluid will be close to the material 22, a portion of the cap 31 is cut out as indicated at 32. The plunger E is attached to the press head as by the flanged ring 33.

Suitable pressure cylinders F have pipes 34 for leading a fluid pressure medium into the cylinder cavities 35, which exerts a pressure against the cup packings 36 acting against the pistons 37, and against the piston rods 26. In operation it is desirable to maintain a suitable pressure within the cylinder cavities 35 in order to rapidly release the pressure in cavity 21 of pressure resisting chamber D when the mold is opened. This pressure likewise maintains the mold cavity 6 of mold B in firm contact with the lower face of platen 4 and likewise maintains a rigid contact between the upper portion of platen 4 and the lower portion of the pressure resisting chamber D.

In operation, high pressure fluid such as water is admitted into the cylinders 35 through suitable valves (not shown) and while such pressure may be intermittent as the cycle of the press would seem to require, it will be found that such pressure may more readily be maintained constant throughout the operation of the press, as the upper part of the movement of the ram 3 will readily overcome the pressure of the pistons 37, if the proper hydrostatic balance is maintained.

In place of the cylinders F, yieldable resistance to movement may be obtained by compression springs, though less desirably as a pressure medium. In place of water, air, oil or nitrogen could be used. I find that nitrogen from a high pressure bottle is most suitable for my purpose. It will be noted that packing glands have been provided as indicated at 38, but these are not essential and if used the packing 39 should be lightly compressed. If the cup packing 36 is in good flexible condition there will be little or no fluid passed beyond it. The cylinders F are rigidly attached to the press head 1 as at 40.

Suitable moldable material 22 having been placed into the pressure cavity 21 and the heating members having been heated, movable ram 3 is forced upward, causing the mold cavity 6 to be closed against the bottom of the top platen 4, and this platen 4 together with the pressure resisting container D is carried upward against the pressure of pistons 37 of cylinders F, whereupon plunger E exerts pressure against material 22 within cavity 21. The material being plastic, but not being heated to a point where energetic action will ensue, only a sufficient amount of material need be forced from cavity 21 through communicating abutted passages 13 to fill mold cavity 6. See Fig. 2.

As the passages 13 and mold cavity 6 are now under pressure between ram 3 and plunger E, the fluid-like hydrostatic pressure is retained therein, and the plastic material is confined in the mold cavity to form the desired shape under a positive pressure, and is heated or cooled to harden and set the molded part while so confined, without allowing the escape of plastic material 22 from mold cavity 6 or passages 13, but gases and volatile material may escape between the contacting faces.

Where thermosetting plastic materials such as synthetic resins are used, the area at 7 is kept at a high heat which will quickly set the material to a hard, set and infusible form.

The position of the press mechanism in Figure 1 is at the beginning of a series of molding operations, the plastic mixture or composition 22, having been placed in pressure resisting container cavity 21. At the end of a series of molding operations platen 4 automatically descends. The need for material within cavity 21, is then indicated by the device G consisting of the adjustment screw 50, depressing switch button 51, closing the circuit indicated by the wires 52, operating a signal device such as lamp 53. This signal is energized so soon as the platen 4 and container D descend, which takes place when material 22 is reduced to a predetermined quantity. The device G may also be made to operate a hopper (not shown) from a reserve supply of material, if desired, to avoid manual refilling.

The ejecting mechanism H consisting of ejector heads 54, rods 55, and return springs 56 acting against press base 2, is shown in Figs. 1 and 3 in a position to eject the molded piece or pieces from the mold cavity 6.

The mold sweeping and cleaning mechanism I, shown in Fig. 3, removes the molded pieces after they have been ejected from the mold cavity or cavities 6. The mechanism is shown as being electrically controlled and air operated. The air is admitted through pipe 57 and valve 58 to air cylinders 59 having pistons 60 (shown in Figure 3) operating preferably against return springs (not shown) and providing power and a lateral reciprocating movement to a tube 61 having air jet openings 62 and a brush 63.

The valve 58 is threeway, admitting compressed air into pipe 64 when a solenoid 65 is energized, operating the valve through armature 66, and link 67, and extending the return spring 68. When the solenoid circuit 69 is open, the valve is closed to the supply of air and the pipe 64 is vented by valve 58 to the open atmosphere.

The solenoid circuit 69 is closed by a latch 70 on ram 3 drawing down dashpot head 71, which grounds or closes the circuit against contact 72, which is preferably adjustable on insulated support 73. By proper adjustment of contact 72, the valve 58 will be opened for the admission of air so soon as ejectors H have forced the molded work from the cavity or cavities 6. These finished pieces will be removed from the mold by the pipe 61, the air issuing from openings 62, and the brushes 63 of Figure 3. The mold cavities will also be cleaned and brushed ready for a new charge of material.

The dashpot piston 74 regulates the length of time the circuit remains closed and is adjustable as to speed of return by the air inlet cock 75. The opening of the circuit closes air supply pipe 57 and vents pipe 64, allowing pipe 61 (Figure 3) to return to normal retracted position.

Figure 2 shows ram 3 coming to rest after plunger E has forced a sufficient amount of plastic material 22, from cavity 21 of the pressure resisting container D. The plastic material has been forced through the abutting passages 13, traveling first through an area of low heat in order to maintain plasticity, and finally being forced through an area of high heat and into the mold cavity 6.

The molded pieces are formed under a positive hydrostatic pressure generated within the material itself, and the darker shaded portions of material located within passage 13 have been reacted to a substantially set and hardened form under the combined action of heat and pressure, whereas the material indicated by lighter shaded lines within passage 13 is still in a plastic and flowing condition. The highly heated zone indicated by the darker shaded portions of passage 13, terminating in and including the mold cavity 6, is heated to a high temperature in order to promote and rapidly cause the final hardening and setting reaction to ensue.

The plastic material 22, although forced under relatively high pressure through the passages 13 and into mold cavity 6, is retained within the confines of these channels and cavity due to the lower surface 41 of container D the upper and lower surfaces 42 of platen 4 and the upper surface 43 of mold B having smooth, true faces, which are under pressure because of the resistance of both the plunger E and the pistons 37 of cylinders F against the pressure of ram E.

The locking cylinders F have the strokes of the pistons 37 so arranged that the mold B, platen 4, and container D are held under firm pressure before any pressure is exerted upon material 22 by ram E.

A sufficient length of time, say one-half to ten minutes (depending, of course, upon the volume and kind of material being treated) having elapsed, the material 22 appearing in darker shaded cross section in mold cavity 6 and passage 13 will have been cured to a solid, infusible and set product, and the mold is then ready to be opened.

In opening the mold, pressure on the plastic material must first be released, and preferably no pressure should exist within cavity 21 of pressure resisting container D, as otherwise material 22 still available for subsequent cycles would be forced out through passage 13 and into the high heat zone of such passage so soon as the infusible portion of the composition had been pulled way from the fusible plastic material. This is arranged for by means of the supporting mechanism C which regulates the travel of the collars 14. This mechanism is so adjusted that the toggle pawls 15 and racks 16 at all times permit the collar 14 to drop a sufficient distance to remove pressure and to produce a vacuum within the pressure container D. Collars 14, however, come to a definite stop, before which the pressure of the pistons 37 of cylinders F maintain a sufficient pressure upon the mold cavity 6 and passages 13 until the pressure within container D has been released by the lowering of the container D with respect to the plunger E. This is better shown in Figure 3.

As there is still sufficient material within container D for subsequent pressing, the container and upper mold section formed by platen 4 are allowed to drop only sufficiently to release pressure, and this portion of the assembly is then supported upon collars 14 held in place by toggle pawls 15.

As the collar 14 supporting screw 50 is in an elevated position, the signal arrangement G consisting of button 51, circuit 52 and signal lamp 53 remains in an inoperative condition.

With the mold B and cavities 6 still in a closed position, the sweeping and cleaning mechanism I is also in an inoperative position and therefore the pipe 61 (shown in Figure 3) is at the end of its stroke either beyond the front or rear of the mold B.

The air supply pipe 64 is shown broken in Figs. 1 and 2 to indicate the omission of the actuating air cylinders 59. This pipe 64 is vented to the atmosphere as by valve 58, and the compressed air supply pipe 57 is closed.

The latch 70 is in a position to engage dashpot head 71 when mold B is opened, this position being shown in Fig. 2.

Dashpot piston 74 is at the top of its stroke and circuit 69 is open, with armature 66 and link 67 extended by the pull of spring 68, closing valve 58 as shown.

Ram 3 continues its descent, and Figure 3 illustrates ram 3 in its fully lowered position, with the mold B lowered and the mold cavity 6 containing the molded piece 42 and the integral infusible gate 43 broken away from the plastic fusible material 44 of passage 13. The collars 14 are lower than the position shown in Figure 2 as the supporting mechanism of toggle pawls 15 now engage the racks 16. The pressure within cylinders F against pistons 37 quickly releases the pressure at the upper level of the plastic material 22 within cavity 21 of container D and produces a partial vacuum, as the plunger E is partly withdrawn from the container. Ram E being relatively close fitting within the cavity 21, and the material 22 being supported by the atmospheric pressure in the lower portion of passage 13, the fusible material is held within passage 13 as indicated by the lighter shaded lines at 44.

The molded piece 42 is removed from mold cavity 6, and the gate indicated as 43 may be removed therefrom and such material as contained within this gate may be ground and mixed with other fresh material for re-use. The gate 43 need not be large and the proportionate size of it is somewhat exaggerated here for clearness in illustration. Under a pressure of one thousand pounds and up to several tons to the square inch it will be realized that a relatively small opening is all that is needed to permit sufficient material to flow rapidly enough to properly fill any desired mold cavity as, for example, the one indicated at 6.

In this instance the platen 4 and the pressure resisting container D and ram E have not had a great deal of travel, but so soon as the level of the material 22 within cavity 21 reaches a predetermined low point, usually a quantity sufficient for one more pressing, the machine operation is interrupted for the addition of more material. The reserve material should not be further reduced because the last pressing will incompletely fill the mold, resulting not only in a defective product, but far worse, causing disastrous thermosetting of material in a spongy state in mold and passages, necessitating hours of cleaning before the mold could be again used. As the predetermined low point the lever 47 of pawl 15 comes in contact with the top screw 48, throwing the pawl 15 out of engagement with the rack 16 and permitting the assembly supported by collars 14 to be lowered with the travel of mold B for a distance sufficient to cause ram E to properly clear cavity 21 of container D, as shown in Fig. 1, thus permitting the introduction of a new supply of material or the removal of an old lot of material if this should be desired. The downward travel of collars 14, however, is interrupted so soon as lever 47 of toggle pawl 15 comes in contact with adjustable bottom stops or screws 49, when the pawl is again caused to engage rack 16 at a predetermined point to permit sufficient clearance for the opening of the mold B, as shown in Fig. 1.

As Figures 2 and 3 show sufficient plastic material 22 in cavity 21, the device G is inoperative, but in Fig. 1 it is operative.

Although it is possible to remove molded piece 42 from the cavity 6 by hand, this operation precludes of the possibility of operating the press automatically. The mechanical arrangement here provided ejects the pieces from the cavities and from the mold and press mechanism as the mold B is opened.

During the lowering of the ram 3, the head 4 carrying latch 70 has engaged dashpot head 71, making contact with adjustable contact member 72. The contacts 71 and 72 are so positioned with respect to the operation of ejectors H that the mechanism for the removal of piece 42, specifically pipe 61 and brushes 63, will contact with piece 42 after ejection from the mold cavity 6.

Circuit 69 being closed, solenoid 65 is energized, operating valve 58, closing pipe 64, and admitting compressed air through valve 58 and pipe 57 to cylinders 59, forcing pistons 60 to move pipe 61 and brush 63 in a lateral motion, removing piece 42 from the press onto a conveyor belt or into a receptacle provided for the purpose.

Air jets 62 and brush 63 also clean and remove from the cavity 6 and mold B any loose foreign material. The supply of air is closed off and the cylinders 59 are vented to the atmosphere by valve 58 so soon as dashpot head 71 passes out of contact with terminal 72 and the mechanism supported by pipe 61 is returned by the action of springs operating against pistons 74. The action of dashpot piston 74 on its up stroke is controlled by air inlet valve 75.

While I have, for simplicity, shown only a single cavity 6 in mold member B, it is to be understood that a multiplicity of cavities can be used and that when ejected from the cavities by suitable mechanism the pieces will be quickly removed from the mold B and press 1.

While the mold cavity 6 indicates a disk, button or sound record cavity, such cavity may extend into the upper mold member 4 if the shape requires it and ejectors similar to those on the bottom, indicated by H, may be used in the upper mold cavity if necessary. Ordinarily this is not required as the design of mold cavities is such that the pieces will stay in the lower cavity. The platen 4 may have the heating members 7 rearranged to avoid such cavities and ejectors or an additional upper mold member (not shown) may be used preferably supported on collars 14. The pressure channel 13 would be extended through the added member and additional heating members should be supplied if needed.

Where a multiplicity of mold cavities are provided in mold member B, the material is fed from passage 13 through passages open when the mold is opened and connecting the various cavities. These may be cut in the upper portion of mold B and, or, lower portion of mold member 4 or in the additional upper mold body if used.

By providing platen 4 with heating members as illustrated at 7, hand molds may be placed in position to be filled by hydrostatic pressure. These molds being provided with channels for the passage of material 22, coinciding with passage 13 and positioned properly by suitable pins on platen 4. These channels would be closed to retain the pressure by the setting of material 22 in such channels and also in the lower portion of passage 13. As these channels are of small cross section, and cause quick setting, the material in the mold cavity will be retained under pressure even though incompletely cured where suitable clamps are provided to hold the mold sections closed. These hand molds may be removed from the press so soon as the material has been set in the lower portion of passage 13 and in the material gates or channels in the mold. The final setting of the material within the cavities can be accomplished by heating the mold between heated platens other than those of the filling press or in ovens heated to a suitable temperature. Thus it is possible to fill several or diverse molds in one press and the composition is available for several fillings as it is retained in the pressure resisting container cavity 21 because pressure is automatically released and vacuum is substituted on material 22 before the release of the mold or the opening of lower portion of passage 13.

The automatic material filling or signalling device G will operate as well with removable molds.

The ejectors H will not be required with hand molds and the circuit 69 should be kept open as the molded pieces are to be removed from the mold outside of the press.

If pins 10 are operated in synchronism with circuit 69 and are withdrawn momentarily and thereby permitting hand molds to slide freely in press, the mechanism actuated by circuit 69, if allowed to function, will remove these molds from the press on to a suitable conveyor. The conveyor would carry the molds through a heated zone or oven to complete the curing of the pieces.

Circuit 69 will also permit the automatic delivery and placing of a new mold, by automatic devices, from a suitable conveyor, thus permitting automatic filling of molds by properly positioning these with respect to automatically synchronized and movable stops such as the pins 10.

The mold member B can be extended beyond the dimensions of the press if the upper and lower mold members are clamped and heated properly. This locking and heating means may be synchronized with the press cycle to secure automatic operation if desired.

No automatic timing valves have been shown for the admission of hydraulic or high pressure fluid to the bottom cylinder of the hydraulic press. Such automatic valves are necessary and several very good makes are now on the market.

Circuit 52 is also utilized to open a switch or power relay delaying the closing of the press until an additional supply of molding material has been supplied to cavity 21. This switch or relay (not shown) is preferably self restoring and returns to normal so soon as circuit 52 is opened by a suitable switch shown at 76. So soon as circuit 52 is opened by the closing of the press, switch 76 should be closed (if used) to restore circuit 52 to normal automatic operation. The switch 76 and relay (not shown) increase production as the normal cycle for the ejection of finished pieces can be made very short and allows a longer interval for the addition of a new supply of material. In the case of some molding work, it is not necessary to supply or use the relay if the machine attendant can give immediate attention to the signal and replenish the material when needed.

It is to be understood that the intention is to provide an automatic press mechanism capable of continuous operation until the supply of material provided for such mechanism has been reduced to a certain predetermined minimum quantity. It should, however, be understood that a supplementary mechanism may be provided which will be brought into operation in conjunction with the pressure resisting container or cylinder at the time that it is opened for a fresh supply of material and that a fresh supply of material may be automatically provided if desired. A suitable hopper or spout properly synchronized and actuated by the press mechanism would be provided to fill the pressure resisting container when necessary with either the mixture of ingredients subsequently convertible to a molding plastic composition or else the molding plastic composition itself.

There are many liquid or sludge-like materials which do not have a clearly defined resinous stage, but which can be conveniently molded by my method. The resin-like bodies made from furfural, furfur-alcohol and condensation products of urea and formaldehyde have no clearly defined dry, fusible and grindable stage and for this reason these products have been used as casting materials only but not in pressure molding.

Various filling materials of organic and inorganic nature, such as shredded cloth, paper, wood flour, paper pulp, asbestos and mica, may be introduced into the mold cavities wherein the resinous products will combine with and thoroughly cover these materials upon being forced into the mold cavity. This method of handling is particularly applicable to the use of large shredded pieces of cotton cloth, canvas, grass-like fibres such as sisal, manila, hemp, jute, bamboo and reed and to the handling of relatively large particles or fibres of asbestos and mica.

Although I have shown a preferred form of mechanism whereby the ram is capable of exerting pressure and subsequently causing a vacuum within the pressure resisting container, under certain conditions of operation the vacuum may be dispensed with although I consider it highly desirable to operate under these conditions. The important point, however, is to release pressure from the supply of material contained within the container as no valve is provided within the passage to close off the flow of plastic material through the orifice or pressure passage when the mold cavity has been opened.

Although I have shown that it is preferable to heat the pressure resisting container and the ram traveling therein by means of a large volume of heating fluid at relatively low temperatures, and while it is my preference to use high temperature water, it is to be understood that any other suitable heating means can be provided and that it is possible, if desired, to heat such container electrically.

The passage or passages leading from the supply container to the mold cavity should be downwardly divergent, to facilitate extraction of the set gate and self-cleaning of the passage. While shown as being relatively straight with few offsets, it is to be understood that in the case of a multiple cavity mold numerous offsets and laterals are to be used to feed such mold cavities, these being fed by a passage or passages similar to those shown by me. Under these conditions a mixture of ingredients is consolidated into a thoroughly blended mass.

My apparatus permits the use of molds of either portable or automatic type and the use of many preferred raw materials in their construction. The usual hardened steel dies can be used but they are expensive. By substituting softer varieties of steel only surface hardened, if at all, I am enabled to provide molds at a fractional cost of the regular molds used heretofore. These and other relatively soft materials, are usable because the material is injected therein in a soft plastic condition.

Various inserts may be positioned in the mold chamber to be coated or covered with composition as desired. These inserts may be of any suitable material such as metal, wood, grass fibres such as rattan, willow, sisal, hemp, jute, or such materials may be preliminarily formed into twisted shapes, which, in the case of sisal, may take on the form of rope. The mold cavity being closed preliminarily to the admission of material, makes possible the stretching or tensioning of such reinforcing members in a very simple and precise manner.

The pressure is flexible and the amount of pressure applied to the plastic material may be varied within very wide limits, depending, of course, on the type of work to be done and upon the type of plastic material used. With a relatively free flowing product, molded pieces of great strength can be produced at hydrostatic pressures as low as one hundred pounds to the square inch, although, of course, for certain purposes the pressures may be as high as one thousand to several thousand pounds to the square inch. However, in the molding of printing plates, sound records, etc., the minimum pressure specified is quite sufficient for my purpose. This is also true in the case of molding against fragile molds such as those made of zinc, lead, plaster, etc. Heretofore high pressures were needed in order to fill the mold cavity and properly close the mold against the resisting pressure of the slow flowing material necessarily used and this has, of course, meant that this brute force method of molding was severe on molds, pins, inserts, etc. The pressure can here be reduced to so low a point that it is possible to mold my material in mold cavities defined in glass and this makes possible the molding of lamp bases and radio tube bases directly on to the glass tube enclosing the operating elements. This dispenses with the operation of first forming a separate base and subsequently cementing such base to the glass bulb which is altogether an undesirable process in that a wholly satisfactory job of cementing cannot be done.

The flow of material under hydrostatic pressure is penetrating because of the relatively greater fluid condition of the molding composition which my process permits me to use, because of the method of heating the composition, and for that reason the material may be forced into various internal structures such as in the production of inner or outer composition lined tubing, rods, etc., of course, made of any material such as bamboo, cane, paper, wood, metal, etc.

While the mold cavity at its outer faces closes snugly to retain, without the production of fins, any molded plastic material forced into such cavity, at the same time gaseous volatile products readily escape. This is an advantage as air contained within the chamber is readily expelled and any gases or the majority of these generated during the final hardening or reaction of the product may readily be expelled from such cavity.

Bulky shock resistant materials such as resinous products including bulky fillers such as canvas, shredded cloth, cotton flock, paper pulp, etc. can readily be used in my apparatus because the pressure resisting container cavity is relatively large and the mold cavity is filled under pressure, the size of the mold cavity always being the size of the piece desired.

Similarly powders not compressed on hot rolls or other bulky powders due to fine grinding, etc. can be utilized without mold cavity changes.

It would be of interest to state that my molds cost only about one-third of the cost of those used at present and this is really a very large saving when we consider that the cost of molds as at present in use averages 160 per cent of the cost of molding compositions used annually.

Repairs to molds are very greatly reduced and this item amounts to about one-third of the mold cost annually.

My apparatus, when periodically replenished with a supply of suitable thermoplastic cementitious material, is capable of functioning automatically without the attention of any operator and requires no other additional attention except to properly position the molds in the molding equipment and to, in a general way, supervise the operation of the mechanism. The molding equipment being driven by suitable automatic valve mechanisms is capable of functioning to the extent that it maintains its supply of material in a plastic cementitious condition, delivers the proper amount of product into the mold cavity or cavities, causes the material within the mold cavities and a portion of the delivery passage to become hardened and set and permits the positive and ready separation of the hardened and set material from the still plastic product. The set pieces are removed from the mold cavity, from the mold and from the molding mechanism, and the mold and cavities are automatically cleaned. My mechanism will satisfactorily handle various mixtures of ingredients not as yet processed into molding compounds. The supply of material becoming low, the apparatus immediately signals this fact and by throwing a switch such signal or monitoring circuit may be utilized to interrupt the usual cycling of the valve mechanism to delay the operation of the press mechanism until a new supply of raw material is provided.

While I have herein shown and described certain preferred embodiments of my invention, I wish it to be understood that I do not confine myself to all of the precise detail herein set forth, as modifications and variations may be made without departing from the spirit of the invention or exceeding the scope of the appended claims.

What I claim is—

1. Apparatus for molding a permanently infusibly thermosetting resinous material comprising a reservoir adapted to hold a supply of material to be molded, a mold, a passage of small cross sectional area interconnecting the reservoir and mold, means to force the material through the passage into the mold, means to heat the mold in order to harden and set the material forced therein, and means including at least two different temperature zones around the aforesaid passage to progressively and substantially heat the material during its flow through the aforesaid passage.

2. Apparatus for molding a permanently infusibly thermosetting resinous material comprising a reservoir adapted to hold a supply of material sufficient for a number of molding cycles, a mold, a passage of small cross sectional area interconnecting the reservoir and mold, means for intermittently forcing plastic material from the reservoir through the passage into the mold, means for maintaining the reservoir at a moderate temperature sufficient to soften the material therein without permitting setting of the same, means to maintain the mold at a higher temperature in order to harden and set the material forced therein, and means to progressively heat the material during its flow through the aforesaid passage.

3. Apparatus for molding a permanently infusibly thermosetting resinous material comprising a reservoir for the material to be molded, a mold, a passage of small cross sectional area interconnecting the reservoir and mold, means for forcing the material from the reservoir through the passage into the mold, means to heat the mold in order to harden and set the material forced therein, means to maintain the portion of the passage near the reservoir at a moderate temperature which will prevent premature setting, and means to maintain the portion of the passage near the mold at a high temperature corresponding to that of the mold.

4. Apparatus for molding a permanently infusibly thermosetting resinous material comprising a reservoir adapted to hold a supply of material sufficient for a number of molding cycles, a mold, a passage of small cross sectional area interconnecting the reservoir and mold, means for intermittently forcing plastic material from the reservoir through the passage to the mold, means for maintaining the reservoir at a moderate temperature sufficient to soften the material therein without permitting setting of the same, means to maintain the mold at a higher temperature in order to harden and set the material forced therein, means to maintain the portion of the passage near the reservoir at a moderate temperature corresponding to that of the reservoir, and means to maintain the portion of the passage near the mold at a high temperature corresponding to that of the mold.

5. Apparatus for molding a permanently infusibly thermosetting resinous material comprising a reservoir adapted to hold a supply of material sufficient for a number of molding cycles, a mold located near the reservoir, a passage of small cross sectional area interconnecting the reservoir and mold, means for intermittently forcing plastic material from the reservoir through the passage to the mold, means for maintaining the reservoir at a moderate temperature sufficient to soften the material therein without permitting setting of the same, means to maintain the mold at a higher temperature in order to harden and set the material forced therein, means to maintain the portion of the passage near the reservoir at a moderate temperature corresponding to that of the reservoir, and means to maintain the passage near the mold at a high temperature corresponding to that of the mold, said passage diverging at its outlet end in order to facilitate withdrawal of the set portion of the material therein with the finished molded article.

6. A molding apparatus comprising an upwardly movable ram carrying a mold, a movable receptacle for material to be molded located above the mold and having a downwardly directed outlet, a stationary plunger located above the receptacle, and means to force the ram upwardly in order to close the mold against the outlet and to thereafter move the receptacle into pressure engagement with the plunger in order to force material into the mold, escape of material from the mold being prevented by the pressure of the plunger on the material.

7. A molding apparatus comprising an upwardly movable ram carrying a mold, a movable receptacle for material to be molded located above the mold and having a downwardly directed outlet, means yieldably resisting upward movement of the receptacle, a stationary plunger located above the reservoir, and means to force the ram upwardly in order to close the mold against the outlet and to thereafter move the receptacle against the yielding resistance into pressure engagement with the plunger in order to force material into 8. A molding apparatus comprising an upwardly movable ram carrying a mold, a movable reservoir adapted to hold a supply of material sufficient for a number of molding cycles and having a downwardly directed outlet, holding means permitting upward movement of the reservoir but preventing more than a limited downward movement of the reservoir, a plunger, means to force the ram upwardly in order to close the mold against the reservoir outlet and to thereafter move the reservoir into pressure engagement with the plunger in order to force a portion of the material into the mold, and means to lower the ram and mold in order to permit removal of the finished article.

9. A molding apparatus comprising an upwardly movable ram carrying a mold, a movable reservoir adapted to hold a supply of material sufficient for a number of molding cycles and having a downwardly directed outlet, means yieldably resisting upward movement of the reservoir, pawl and rack means permitting upward movement of the reservoir but positively preventing more than a limited downward movement of the reservoir, a plunger, means to force the ram upwardly in order to close the mold against the reservoir outlet and to thereafter move the reservoir against the yielding resistance into pressure engagement with the plunger in order to force a portion of the material into the mold, means to lower the ram and mold in order to permit removal of the finished article, the slight downward movement of the reservoir permitted by the pawl and rack means releasing the pressure until the next molding cycle, and means making the pawl and rack means inoperative and permitting the reservoir to separate from the plunger when the material in the reservoir reaches a predetermined minimum.

10. A molding apparatus for molding a permanently infusibly thermosetting resinous material comprising an upwardly movable ram carrying a mold, a movable reservoir adapted to hold a supply of material sufficient for a number of molding cycles and having a downwardly directed outlet, holding means permitting upward movement of the reservoir but preventing more than a limited downward movement of the reservoir, a plunger, means to force the ram upwardly in order to close the mold against the reservoir outlet and to thereafter move the reservoir into pressure engagement with the plunger in order to force a portion of the material into the mold, means to lower the ram and mold in order to permit removal of the finished article, means to maintain the plunger and reservoir at a temperature keeping the material softened but preventing setting thereof, and means to heat the mold to a substantially higher temperature in order to set the material therein.

11. A molding apparatus for molding a permanently infusibly thermosetting resinous material comprising an upwardly movable ram carrying a mold, a movable reservoir adapted to hold a supply of material sufficient for a number of molding cycles and having a downwardly directed outlet, means yieldably resisting upward movement of the reservoir, pawl and rack means permitting upward movement of the reservoir but positively preventing more than a limited downward movement of the reservoir, a plunger, means to force the ram upwardly in order to close the mold against the reservoir outlet and to thereafter move the reservoir against the yielding resistance into pressure engagement with the plunger in order to force a portion of the material into the mold, means to lower the ram and mold in order to permit removal of the finished article, the slight downward movement of the reservoir releasing the pressure therein until the next molding cycle, means making the pawl and rack means inoperative and permitting the reservoir to separate from the plunger when the material in the reservoir reaches a predetermined minimum, means to maintain the plunger and reservoir at a temperature keeping the material softened but preventing setting thereof, and means to heat the mold to a substantially higher temperature in order to set the material therein.

12. Apparatus for the molding of a permanently infusibly thermosetting resinous material, comprising a pressure chamber, a mold in flow communication therewith, means applying a heating medium of relatively moderate temperature to the pressure chamber in order to bring the material therein to a plastic condition without setting, means for forcing the plastic material out of the pressure chamber and into the mold, means separately applying a different heating medium of relatively high temperature to the mold in order to cause the material therein to harden and set, and means to heat insulate the pressure chamber from the mold.

13. In a mechanism for use in molding a permanently infusibly thermosetting resinous material, a mold, a reservoir assembly adapted to hold a supply of said material and having a relatively small or constricted passage leading to the mold, means to heat the passage near the reservoir assembly to a moderate temperature, and means to heat the passage near the mold to a substantially higher temperature, in order to raise the temperature of the material to its reaction temperature during but not prior to its transfer into the mold.

14. In mechanism for molding a permanently infusibly thermosetting resinous material, a reservoir adapted to hold a supply of material sufficient for a series of molding cycles, a ram, a mold communicating with said reservoir, means to heat the reservoir to a moderate temperature to prevent rapid reaction of the material, means to heat the mold to a relatively high temperature to cause rapid reaction and setting of material forced therein, means for so relatively moving the ram and the reservoir that pressure is alternately applied on the material in the reservoir for a portion of each molding cycle and is released and a partial vacuum produced and maintained in the reservoir during the remainder of each molding cycle, and means to both release the pressure and break the vacuum by opening the reservoir to replenish the supply of material therein after the completion of the series of molding cycles.

15. In a mechanism for use in molding a permanently infusibly thermosetting resinous material, a mold, a reservoir assembly communicating with said mold and adapted to hold a supply of said material sufficient for a series of molding cycles, a plunger operating within the reservoir, means to heat the reservoir to a moderate temperature to prevent rapid reaction of the material, means to heat the mold to cause reaction and setting of material forced therein, means so relatively moving the plunger and reservoir in repeated cycles that the reservoir is placed under a desired high pressure for only a portion of each of the successive molding cycles and is wholly released and a partial vacuum produced and maintained in the reservoir during the remainder of each molding cycle, and means for automatically stopping the continuous series of molding cycles when the supply of material in the reservoir reaches a predetermined minimum and before the plunger has reached the end of its permitted travel in the reservoir.

16. In mechanism for molding a permanently infusibly thermosetting resinous material, a mold, a reservoir in flow communication with the mold and adapted to hold a supply of material sufficient for a series of molding cycles, a ram, means to heat the reservoir to a moderate temperature to prevent rapid reaction of the material, means to heat the mold to a higher temperature to cause rapid reaction and setting of the material, means for so relatively reciprocating the ram and the reservoir that pressure is alternately applied on the material in the reservoir and positively released by reverse movement of the parts, means to positively limit the reverse movement in each cycle to a slight amount, whereby the pressure movement is made progressive and is also reduced to a minimum, and means to automatically stop the molding mechanism at the end of the series of molding cycles.

17. In mechanism for molding a permanently infusibly thermosetting resinous material, a reservoir adapted to hold a supply of material sufficient for a series of molding cycles, a ram, a mold communicating with said reservoir, means to heat the reservoir to a moderate temperature to prevent rapid reaction of the material, means to heat the mold to cause reaction and setting of material forced therein, means for so relatively reciprocating the ram and the reservoir that pressure is alternately applied on the material in the reservoir and positively released by reverse movement of the parts, means to positively limit the reverse movement in each cycle to a slight amount, whereby the pressure movement is made progressive and is also reduced to a minimum, an automatic ejector for removal of the molded piece and any additional set material from the molding mechanism during each molding cycle, an automatic device for cleaning the mold and cavity after each molding cycle, and means to automatically stop the molding mechanism at the end of the series of molding cycles.

18. In an apparatus for molding a permanently infusibly thermosetting resinous material, a reservoir adapted to hold a supply of such material sufficient for a number of molding cycles, a mold located adjacent the reservoir, a divergent outlet connecting the reservoir and the mold, means for circulating a heating fluid having a moderate temperature around the reservoir to soften the material therein without setting the same, means for forcing material in a plastic condition from the reservoir to the mold, means for circulating a different heating fluid having a substantially higher temperature around the mold in order to harden and set the material in the mold, and means to remove all of the set and infusible material from the apparatus at the end of each cycle, the divergent outlet facilitating removal therefrom of any set material therein together with the molded article, in order to clear the apparatus of such material preparatory to the next molding cycle.

19. Molding apparatus for molding a permanently infusibly thermosetting resinous material comprising an upwardly movable ram, a separable mold above the ram, a movable reservoir above the mold, said reservoir being adapted to hold a supply of material sufficient for a number of molding cycles and having a downwardly directed outlet leading to the mold, a stationary plunger above the reservoir, whereby upward movement of the ram closes the mold and forces the same bodily upwardly with the reservoir against the plunger in order to force material from the reservoir into the mold, means to moderately heat the reservoir in order to soften but not set the material carried thereby, and means to heat the mold to a substantially higher temperature in order to harden and set the material therein.

20. Molding apparatus comprising an upwardly movable ram, a separable mold above the ram, a movable receptacle above the mold, said receptacle having a downwardly directed outlet leading to the mold, means yieldably resisting upward movement of the receptacle and a stationary plunger above the receptacle, whereby upward movement of the ram closes the mold and forces the same bodily upwardly with the receptacle against the plunger in order to force material from the receptacle into the mold.

21. Molding apparatus comprising an upwardly movable ram, a separable mold, the lower mold portion resting on the ram, means for elevatedly supporting the upper mold portion in the path of the lower mold portion, a movable reservoir above the mold, said reservoir being adapted to hold a supply of material sufficient for a number of molding cycles and having a downwardly directed outlet leading to the mold, means yieldably resisting upward movement of the reservoir, a stationary plunger above the reservoir, whereby upward movement of the ram closes the mold and forces the same bodily upwardly with the reservoir against the plunger in order to force material from the reservoir into the mold, and downward movement of the ram opens the mold.

22. Molding apparatus for molding a permanently infusibly thermosetting resinous material comprising an upwardly movable ram, a separable mold above the ram, a movable reservoir above the mold, said reservoir being adapted to hold a supply of material sufficient for a number of molding cycles and having a downwardly directed outlet leading to the mold, means yieldably resisting upward movement of the reservoir, a stationary plunger above the reservoir, whereby upward movement of the ram closes the mold and forces the same bodily upwardly with the reservoir against the plunger in order to force material from the reservoir into the mold, means to moderately heat the reservoir in order to soften but not set the material carried thereby, and means to heat the mold to a substantially higher temperature in order to harden and set the material therein.

23. In a molding apparatus for transfer molding an infusibly thermosetting resinous material, a material-containing reservoir, a mold located adjacent thereto, means to heat the mold, a relatively elongated constricted passageway extending between the reservoir and the mold, and means to force material from the reservoir through the passage and into the mold, said passageway diverging in the direction from the reservoir toward the mold, in order to freely release with the set molded piece any set material in the passageway.

24. In a molding apparatus for transfer molding an infusibly thermosetting resinous material, a material-containing reservoir, a separable mold located adjacent thereto, a relatively elongated constricted passageway extending between the reservoir and the mold in the direction of separation of the mold and diverging in said direction toward the mold, means to force material from the reservoir through the passage to the mold, means for heating the material in the reservoir in order to soften but not set the same, and means for heating the mold to a higher temperature in order to harden and set the material therein, the taper of the passageway serving to release any set material therein with the set molded piece when the mold is opened.

25. Apparatus for molding a permanently infusibly thermosetting resinous material comprising a primary pressure chamber, a mold, a constricted channel or gate interconnecting the same, means to force material from the chamber through the channel into the mold, and means to heat the mold to set the material therein, said channel diverging throughout its length from the pressure chamber to the mold in order to facilitate withdrawal of any hardened and set material therefrom together with the molded article, so that the channel will in operation be automatically self-cleaning.

26. Apparatus for molding a permanently infusibly thermosetting resinous material comprising a reservoir adapted to hold material to be molded, a mold, a passage of small cross-sectional area interconnecting the reservoir and mold, means for forcing the material from the reservoir through the passage to the mold, means to heat the mold in order to harden and set the material forced therein, means to moderately heat the first part of the passage, and means to heat the last part of the passage to a relatively high temperature, in order to progressively increasingly heat the material during its flow through the aforesaid passage, said passage diverging at its outlet end in order to facilitate withdrawal of the set portion of the materal therein with the finished molded article.

27. Apparatus for molding a permanently infusibly thermosetting resinous material comprising a reservoir for material to be molded, a mold, means for forcing plastic material from the reservoir into the mold, means to heat the reservoir to a moderate temperature, means to heat the mold to a substantially higher temperature in order to quickly harden and set the material forced therein, and means interposed between the mold and reservoir to prevent heat transfer from the hot mold to the relatively cooler reservoir and to thereby prevent the reservoir from being brought up to the mold temperature.

28. Apparatus for molding a permanently infusibly thermosetting resinous material comprising a reservoir adapted to hold a supply of material sufficient for a number of molding cycles, a mold, a passage interconnecting the reservoir and mold, means for intermittently forcing plastic material from the reservoir into the mold, means to heat the reservoir to a moderate temperature sufficient to soften the material therein without permitting setting of the same, means to heat the mold to a substantially higher temperature in order to quickly harden and set the material forced therein, and means interposed between the mold and reservoir to prevent heat transfer from the hot mold to the relatively cooler reservoir, in order to help maintain the desired difference in temperature therebetween.

29. The method of molding a permanently infusibly thermosetting resinous material by the use of a mold and a relatively large pressure chamber in flow communication therewith, which includes placing in the pressure chamber a quantity of the infusibly thermosetting resinous material sufficient for a series of molding cycles, keeping the pressure chamber at a moderate temperature and subjecting the same to pressure in order to soften the material and force a portion thereof in a plastic state from the pressure chamber into the mold until the mold is filled, continuing the pressure and keeping the mold at a substantially higher temperature in order to heat the material until it reacts and assumes the shape of the mold in a permanently set and infusible condition during each cycle, and at the same time maintaining the balance of the supply of material in the pressure chamber at the substantially lower or moderate temperature in order to prevent it from reacting to the permanently set and infusible condition, and at the end of each cycle removing from the apparatus the molded piece and any additional set material.

30. The method of molding an infusibly thermosetting resinous material by the use of a mold and a relatively large pressure chamber in flow communication therewith, which includes placing in the pressure chamber a quantity of the infusibly thermosetting resinous material sufficient for a series of molding cycles, keeping the pressure chamber at a moderate temperature and subjecting the same to pressure in order to soften the material and force a portion thereof in a plastic state from the pressure chamber into the mold until the mold is filled, continuing the pressure and keeping the mold at a substantially higher temperature in order to heat the material until it reacts and assumes the shape of the mold in a permanently set and infusible condition, and at the same time cooling the apparatus between the pressure chamber and mold to prevent heat transfer from the mold to the pressure chamber so as to maintain the balance of the supply of material in the pressure chamber at the substantially lower or moderate temperature in order to prevent it from reacting to the permanently set and infusible condition, and at the end of each cycle removing from the apparatus the molded piece and any additional set material.

31. The method of molding an infusibly thermosetting resinous material by the use of a mold and a relatively large pressure chamber in flow communication therewith, which includes placing in the pressure chamber a quantity of the infusibly thermosetting resinous material sufficient for a series of molding operations, subjecting the material to heat and pressure in order to plasticize the material and force a portion thereof into the mold, maintaining the mold at a substantially high temperature in order to cause the material therein to react and assume the shape of the mold in a permanently set and infusible condition, releasing the pressure and producing a partial vacuum in the pressure chamber without opening the pressure chamber to the atmosphere, opening the mold and removing the molded product, thereupon repeating the molding cycle until the material in the pressure chamber is nearly but not entirely exhausted, and finally opening the pressure chamber and refilling it with a fresh supply of the molding material.

32. Apparatus for molding a permanently infusibly thermosetting resinous material, comprising a receptacle for the material to be molded, a mold, a passage of small cross-sectional area interconnecting the receptacle and the mold, means for forcing the material from the receptacle through the passage into the mold, means to heat the mold in order to harden and set the material forced therein, means to circulate around the portion of the passage near the reservoir a fluid heating medium of moderate temperature insufficient to cause premature setting, and means to circulate around the portion of the passage near the mold a different fluid heating medium of high temperature.

33. A molding apparatus comprising an upwardly movable ram carrying a mold, a movable reservoir adapted to hold a supply of material sufficient for a number of molding cycles and having a downwardly directed outlet, means yieldably resisting upward movement of the reservoir, pawl and rack means permitting upward movement of the reservoir but positively preventing more than a limited downward movement of the reservoir, a plunger, means to force the ram upwardly in order to close the mold against the reservoir outlet and to thereafter move the reservoir against the yielding resistance into pressure engagement with the plunger in order to force a portion of the material into the mold, and means to lower the ram and mold in order to permit removal of the finished article, the slight downward movement of the reservoir permitted by the pawl and rack means releasing the pressure until the next molding cycle.

34. A molding apparatus comprising an upwardly movable ram carrying a mold, a movable reservoir for material to be molded located above the mold and having a downwardly directed outlet, said reservoir being adapted to hold a supply of material sufficient for a series of molding cycles, a stationary plunger located above the reservoir, means to force the ram upwardly in order to close the mold against the reservoir outlet and to thereafter move the reservoir into pressure engagement with the plunger in order to force material into the mold, means for opening the mold and emptying the apparatus of all reacted material in each molding cycle, an automatic device for cleaning the molding cavity after each molding cycle, and means to withdraw the ram entirely from the reservoir when the material in the reservoir is nearly exhausted, in order to permit refilling of the reservoir.

35. Molding apparatus comprising a press having a fixed top head, an upwardly movable main ram, a bottom platen mounted on said ram, auxiliary opposed rams, a top platen mounted on said opposed rams, mating separable top and bottom mold portions mounted on said top and bottom platens, a pressure chamber mounted on said top platen and communicating with the mold cavity by a constricted outlet, a mating plunger fixedly mounted on the top head of the press for forcing molding material from the pressure chamber into the mold, and stop means to arrest downward movement of the upper platen at an intermediate position in order to open the mold when the main ram is lowered, whereby upward movement of the main ram first closes the mold and then moves the closed mold and pressure chamber toward the stationary plunger against the resistance of the opposed rams.

36. Molding apparatus comprising a press having fixed top and bottom heads, a main hydrostatically operated ram passing through the bottom head, a bottom platen mounted on said ram, auxiliary opposed hydrostatically operated rams passing through the top head to cylinders mounted above said top head, a top platen mounted on said opposed rams, mating separable top and bottom mold portions mounted on said top and bottom platens, a pressure chamber mounted on said top platen and communicating with the mold cavity by a constricted diverging outlet, a mating plunger fixedly mounted on the top head of the press for forcing molding material from the pressure chamber into the mold, and stop means to arrest downward movement of the upper platen at an intermediate position in order to open the mold when the main ram is lowered, whereby upward movement of the main ram first closes the mold and then moves the closed mold and pressure chamber toward the stationary plunger against the resistance of the opposed rams.

37. Molding apparatus for molding a permanently infusibly thermosetting resinous material, comprising an upwardly movable ram, a lower mold portion above the ram, a mating upper mold portion and a movable pressure chamber above the lower mold portion, said pressure chamber having a downwardly directed outlet which diverges from the pressure chamber to the mold cavity, means yieldably resisting upward movement of the upper mold portion and pressure chamber, a stationary plunger above the reservoir, means limiting downward movement of the upper mold portion in order to open the mold upon downward movement of the ram, and means to heat the mold in order to help react and set the resin forced therein, said downwardly divergent outlet facilitating removal of set and infusible material from the outlet together with the molded article, in order to clear the apparatus of such material preparatory to the next molding operation.

38. Molding apparatus for molding a permanently infusibly thermosetting resinous material comprising an upwardly movable ram, a lower mold portion above the ram, a mating upper mold portion and a movable reservoir above the upper mold portion, said reservoir being adapted to hold a supply of material sufficient for a number of molding cycles and having a downwardly directed outlet which diverges from the reservoir to the mold cavity, means yieldably resisting upward movement of the upper mold portion and reservoir, a stationary plunger above the reservoir, means limiting downward movement of the upper mold portion in order to open the mold upon downward movement of the ram, means to moderately heat the reservoir in order to soften but not set the material carried thereby, and means to heat the mold to a substantially higher temperature in order to harden and set the material therein, said divergent outlet facilitating removal of any reacted and set material in the outlet with the molded article in order to clear the apparatus of reacted material preparatory to the next molding cycle.

EMIL E. NOVOTNY.